F. J. H. FLECK.
FILM WINDING APPARATUS.
APPLICATION FILED AUG. 16, 1910.
1,095,096.
Patented Apr. 28, 1914.
4 SHEETS—SHEET 1.
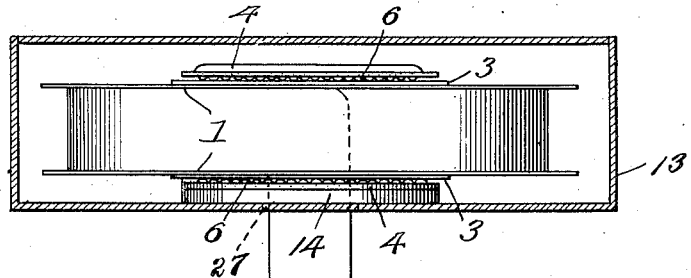
Fig. 1.
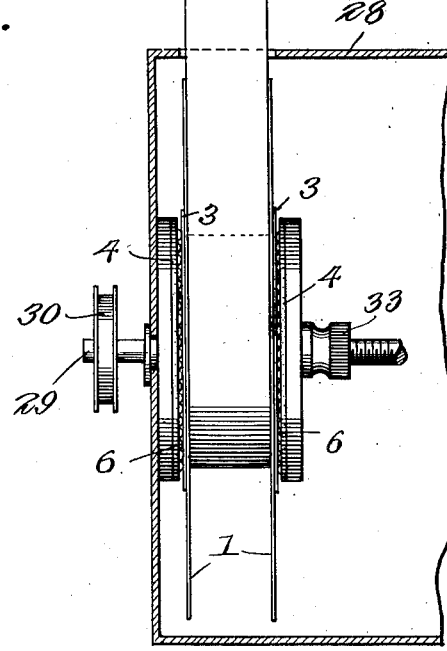
Witnesses
Frank B. Hoffman
James A. Koehl
Inventor
Ferdinand J. H. Fleck
By Victor J. Evans
Attorney F. J. H. FLECK.
FILM WINDING APPARATUS.
APPLICATION FILED AUG. 16, 1910.
1,095,096.
Patented Apr. 28, 1914.
4 SHEETS—SHEET 2.
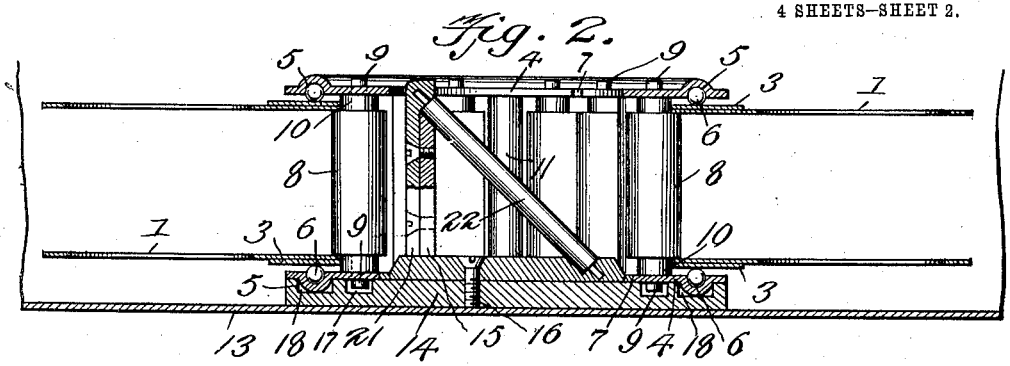
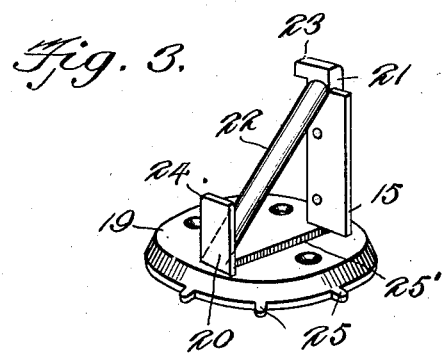
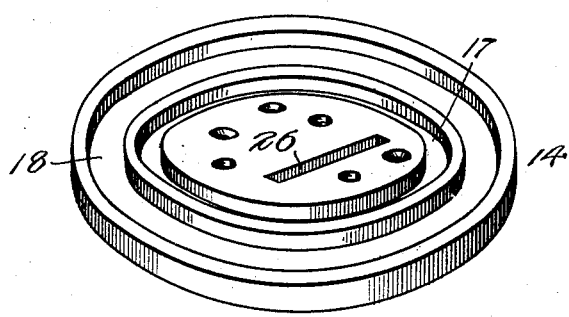
Witnesses
Frank B. Hoffman
James A. Koehl
Inventor
Ferdinand J. H. Fleck
By Victor J. Evans
Attorney

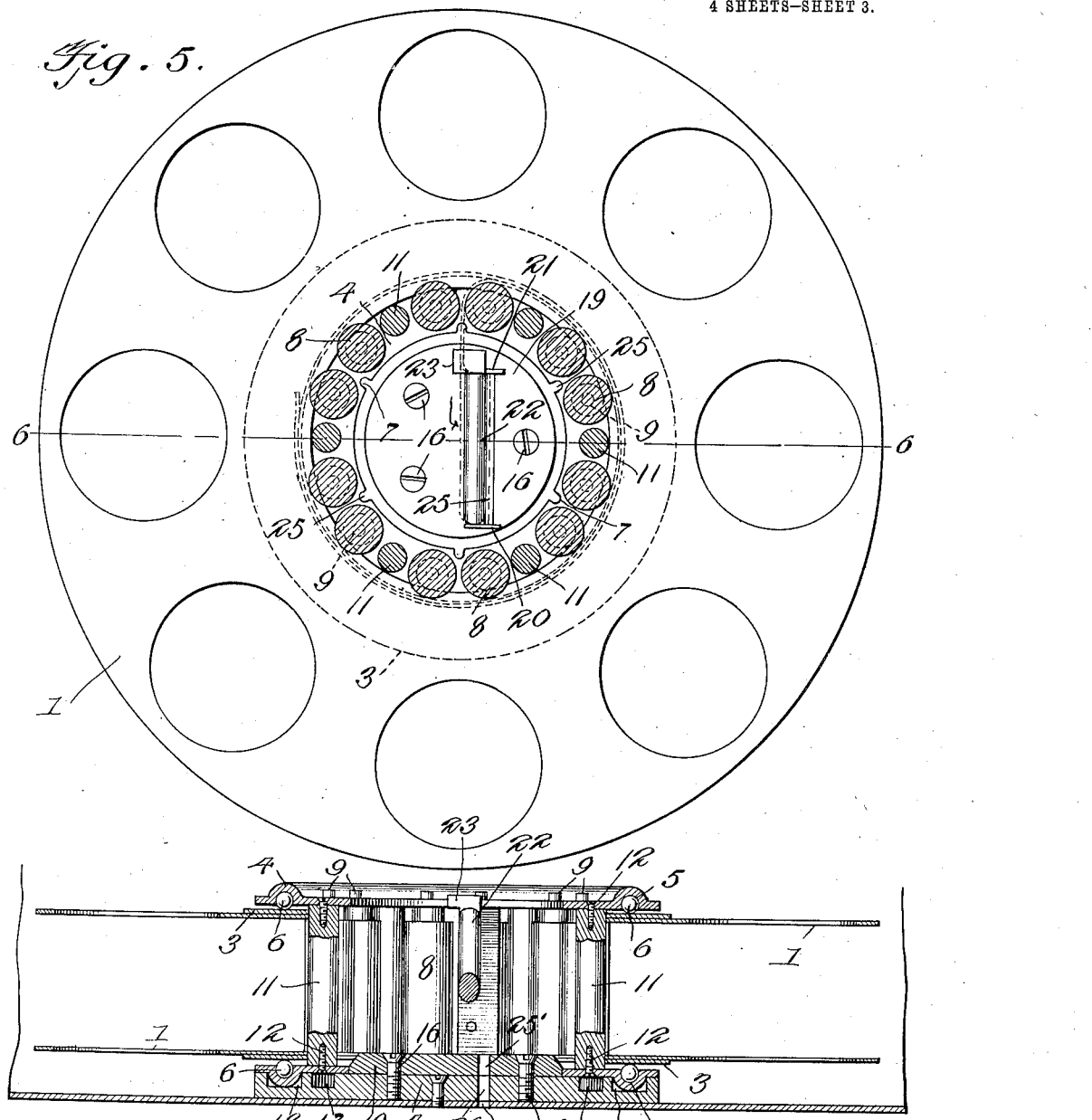

F. J. H. FLECK.
FILM WINDING APPARATUS.
APPLICATION FILED AUG. 16, 1910.
1,095,096.
Patented Apr. 28, 1914.
4 SHEETS—SHEET 4.
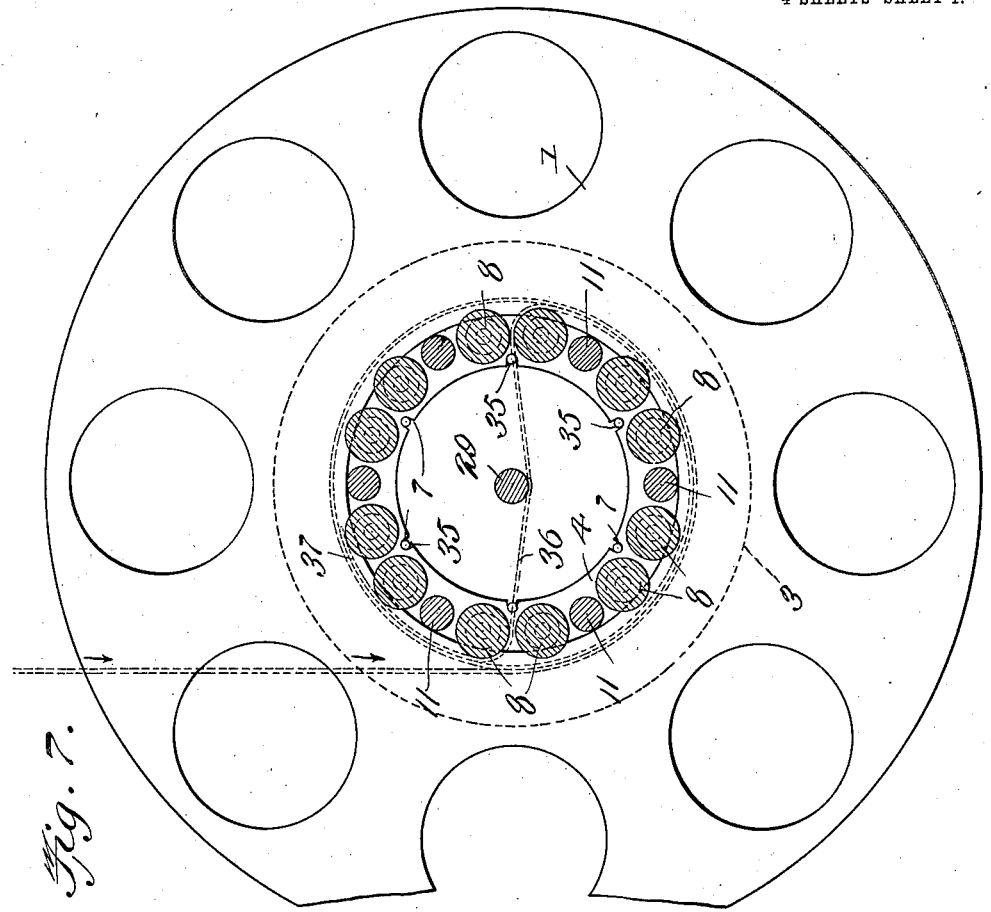
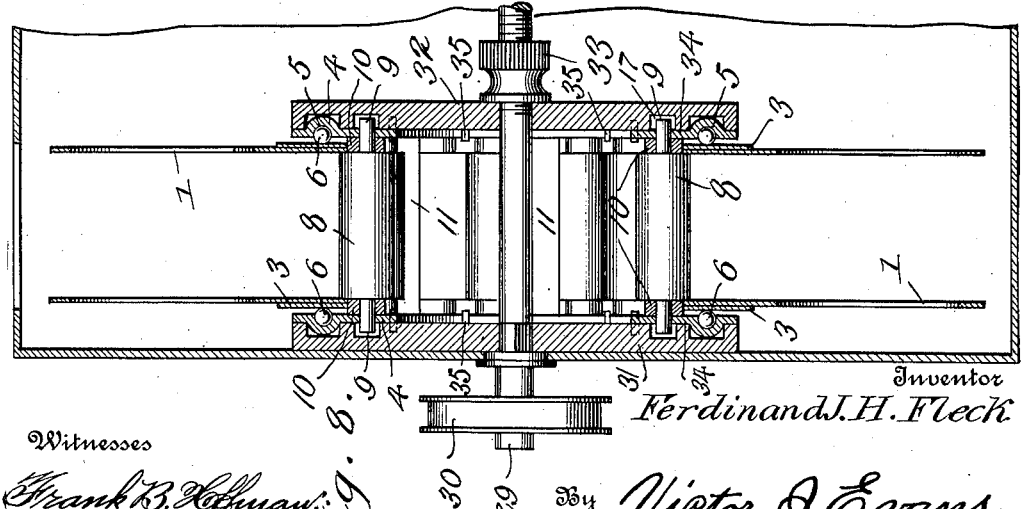
Witnesses
Frank B. Hoffman
James A. Koebel
Inventor
Ferdinand J. H. Fleck
By Victor J. Evans
Attorney

UNITED STATES PATENT OFFICE.

FERDINAND J. H. FLECK, OF TAMAQUA, PENNSYLVANIA.

FILM-WINDING APPARATUS.

1,095,096.  Specification of Letters Patent.  Patented Apr. 28, 1914.

Application filed August 16, 1910. Serial No. 577,384.

*To all whom it may concern:*

Be it known that I, FERDINAND J. H. FLECK, a citizen of the United States of America, residing at Tamaqua, in the county of Schuylkill and State of Pennsylvania, have invented new and useful Improvements in Film-Winding Apparatus, of which the following is a specification.

This invention relates to film-winding apparatus for moving picture machines and it consists in the provision of identically formed reels which are interchangeably associated in the upper and lower magazines, the object of the invention being to construct winding apparatus of this character wherein the film from the upper magazine can be wound onto the reel in the lower magazine so that the front end of the film will be disposed inwardly of the innermost wound portion, means being employed for revolubly supporting the lower reel and for fixing the upper reel so that on winding the film from the upper to the lower reel it can be uncoiled from the upper reel from the innermost wound portion.

A still further object of the invention is to construct each reel of the winding apparatus so as to prevent damaging wear and tear on the film and to construct each reel so as to obviate any abrupt or injurious bending of the film in the winding operation.

In the drawings, forming a portion of this specification and in which like numerals of reference indicate similar parts in the several views:—

Figure 1 is a front view of the two reels of my winding apparatus showing them in the upper and lower magazines, the said magazines being shown in section. Fig. 2 is a detail section through a portion of the upper magazine and through the reel. Fig. 3 is a perspective view of the film guide in the upper magazine. Fig. 4 is a perspective view of the reel support in the upper magazine. Fig. 5 is a section through the reel in the upper magazine showing the manner of threading the front end of the film over the film guide. Fig. 6 is a longitudinal section therethrough taken on the line 6—6 of Fig. 5. Fig. 7 is a view similar to Fig. 5 showing the manner of threading the film into the reel of the lower magazine. Fig. 8 is a section through the reel in the lower magazine showing the manner of fixing the same with the winding shaft.

Each reel is identical in construction to permit of the interchangeable association of the reels in the upper and lower magazines. It is believed that a description of one reel will suffice for the description of both and it may be described that each consists of the spaced film-guiding plates 1 which are apertured centrally for a purpose to be hereinafter described. Each guide plate 1 is provided on its outer surface with a central collar 3 which extends entirely around the aperture. Diametrically opposite members 4 are arranged at the sides of the said guiding plates, and as illustrated, each member is formed with an annular concavity or raceway 5 in which the antifriction bodies 6 are arranged. The members 4 are apertured centrally and each aperture has its walls formed to provide radial notches 7 for a purpose to be hereinafter explained. An annular series of rollers 8 form the hub of the reel, and as illustrated, each roller is provided at its ends with trunnions 9 which extend through correspondingly formed passages in the members 4. The rollers entirely occupy the space between the plates 1 and at the ends the rollers have fitted thereto small collars 10 which engage the walls of the apertures in the plates 1. This construction is such that the plates may revolve independently of the members 4. The rollers are arranged in pairs, each pair being separated from each other by a spacing element 11, fastening devices 12 being engaged with the said spacing elements at the ends thereof and with the members 4.

The upper magazine 13 is provided at its bottom with a support 14 on which the film guide 15 is mounted, fastening screws or such equivalent devices 16 being employed for holding the film guide fixed to the support. The support 14 is provided with an annular groove 17 which receives the projecting trunnions of the reel, as shown in Fig. 2 of the drawings. The support is provided with a second annular groove 18 which receives the offset race-forming portion of the member 4. The film guide 15 consists of a horizontally disposed body member 19 on which the supporting brackets 20 and 21 are formed. A guide roller 22 is arranged at an angle of forty-five degrees approximately to the body member 19 and it is operatively journaled in the brackets 20 and 21. The bracket 21 is formed at its upper end to provide a lateral film guide 23. The bracket 20 is formed to provide an upwardly extending film guide 24 which extends above the lowest point of the film-guiding roller 22. In order that the reel can be held stationary in the upper magazine during the unwinding operation of the film from the upper reel to the lower reel, lugs or equivalent fastening devices 25 are employed. These lugs are formed integral with the body member 19 of the film guide and they fit the correspondingly formed notches 7 in the lowermost guiding plate 1 in the upper reel. The body member 19 of the film guide is provided with a film-guiding slot 25' which is located immediately in line with the slot 26 in the support 14 and in line with a similar slot 27 in the bottom of the upper magazine.

The lower magazine 28 is provided with a winding shaft 29 on which is mounted a driving pulley 30 which may receive its power from any source of supply as is obvious, but preferably from the driving shaft of the picture machine. The driving shaft 29 has fixed thereto a clamping member 31 which is somewhat similar in construction to the previously described support 14. A movable clamping member 32 is mounted on the shaft and as illustrated, a clamping nut 33 is adjustable on the shaft and may be brought to bear against the member 32 to move it toward the companion member 31. As hereinbefore described, each reel is identical in construction so as to permit of their interchangeable association with the upper and lower magazines of the picture machine. The members 34 in the reel of the lower magazine are confined between the clamping members 31 and 32. These clamping members are provided with locking pins 35 which extend longitudinally with the axis of the shaft so as to fit in the notches 7. This construction permits the reel to be operatively associated with the winding shaft in the lower magazine so as to cause the reel to rotate with such shaft.

In the operation of my improved film-winding apparatus, I place an empty reel in the lower magazine and a wound reel in the upper magazine. In winding the film first onto that reel which is to be placed in the upper magazine I take the front end of the film and extend it through the opening in the hub of the reel and passing it between the rollers of the diametrically opposite pairs, as shown at 36 in Fig. 7 of the drawings, and I then wind the film about the hub, as shown, confining the front end 37 between the rollers and the adjacent wound portion of the film. After the film has been wound upon the reel as described, the front end 37 is drawn from between the rollers and the said adjacent wound portion of the film and it is then threaded over the film-guiding roller 22 and through the slots 25', 26 and 27 and then through the slot in the lowermost magazine. The film is then confined to the hub of the lower reel, as illustrated in Fig. 7 of the drawings. After the film from the reel of the upper magazine has been started onto the reel in the lower magazine as hereinbefore mentioned, power is applied to the winding shaft 29 to wind the film from the upper reel to the lower reel. As stated, the upper reel is stationary with the exception of the film-guiding plate 1 and on winding of the lower reel the film may be drawn from the center of the upper reel and then associated with the lower reel so that the operator can substitute one reel for the other after the winding operation.

In view of the fact that the reels are identically constructed the apparatus will be found most desirable particularly in that I provide for their immediate interchangeable association in the respective magazines of the picture machine. On account of the fact that I provide for the rotation of the film-guiding plates 1 when the hub is stationary on its support I greatly reduce the friction on the film and prevent the same from becoming accidentally destroyed during the winding operation.

I claim:

1. In film-winding mechanism, a magazine reel having an apertured hub portion, a film-guiding portion movable about the said hub portion, a support removably engaged with the hub portion and holding the same against movement with the said film-guiding portion, the said support having a film-guiding slot therein, a second reel having an apertured hub portion and a movable film-guiding portion, a revolving support, means on the support for engagement with the hub portion of the second reel to cause the same to revolve with the support, and a film-guiding element on the first support for directing the film from the first reel onto the said second reel.

2. In film-unwinding mechanism, a revoluble film holder centrally apertured, a stationary support therefor coaxial with said aperture, said support having a film-guiding slot therein, and film-guiding means arranged to guide the film from the inner turn of the film coil toward said slot.

In testimony whereof I affix my signature in presence of two witnesses.

FERDINAND J. H. FLECK.

Witnesses:
 REBECCA S. BEARD,
 SAMUEL R. BEARD.